United States Patent [19]

Lindahl

[11] Patent Number: 5,558,473
[45] Date of Patent: Sep. 24, 1996

[54] LABYRINTH SEAL COAL INJECTOR

[75] Inventor: Philip D. Lindahl, 12600 Etruscan Dr., Herndon, Va. 22071

[73] Assignee: Philip D. Lindahl, Herndon, Va.

[21] Appl. No.: 290,572

[22] Filed: Aug. 15, 1994

[51] Int. Cl.[6] .................................................. B65G 53/48
[52] U.S. Cl. ........................................ 406/61; 406/56
[58] Field of Search ............................. 406/56, 60, 61; 198/671

[56] References Cited

U.S. PATENT DOCUMENTS

| | | | |
|---|---|---|---|
| 1,614,713 | 1/1927 | Caracristi . | |
| 1,954,005 | 4/1934 | Westberg et al. | 406/56 |
| 2,299,565 | 10/1942 | Colburn | 406/61 |
| 3,360,301 | 12/1967 | Donaho | 302/53 |
| 4,286,935 | 9/1981 | Okuno et al. | 406/56 |
| 4,391,561 | 7/1983 | Smith et al. | 406/61 |
| 4,394,132 | 7/1983 | Taylor | 44/51 |
| 4,449,862 | 5/1984 | Beck | 406/93 |
| 4,557,636 | 12/1985 | Beck et al. | 406/19 |
| 4,824,294 | 4/1989 | Kortenbusch et al. | 406/93 |
| 4,851,110 | 7/1989 | Rolle et al. | 406/61 |

FOREIGN PATENT DOCUMENTS

| | | | |
|---|---|---|---|
| 774958 | 12/1934 | France | 406/56 |
| 1215773 | 4/1960 | France | 406/56 |
| 1087974 | 8/1960 | Germany | 406/56 |
| 128878 | 11/1978 | Japan | 406/56 |
| 1323495 | 7/1987 | Japan | 406/56 |
| 829518 | 5/1981 | U.S.S.R. | 406/56 |

*Primary Examiner*—Gary C. Hoge
*Attorney, Agent, or Firm*—William S. Ramsey

[57] ABSTRACT

The labyrinth seal coal injector is a safe, cost-effective means of continuously injecting dry, sized, coal and other mined materials into a pressurized hydraulic pipeline for transport. The injector consists of a rotor or screw rotated by a motor. Coal is compacted in the injector and forms a hydraulic seal against the pressure in the pipeline. A knife valve is used in initiation of the flow of coal into the pipeline.

10 Claims, 2 Drawing Sheets

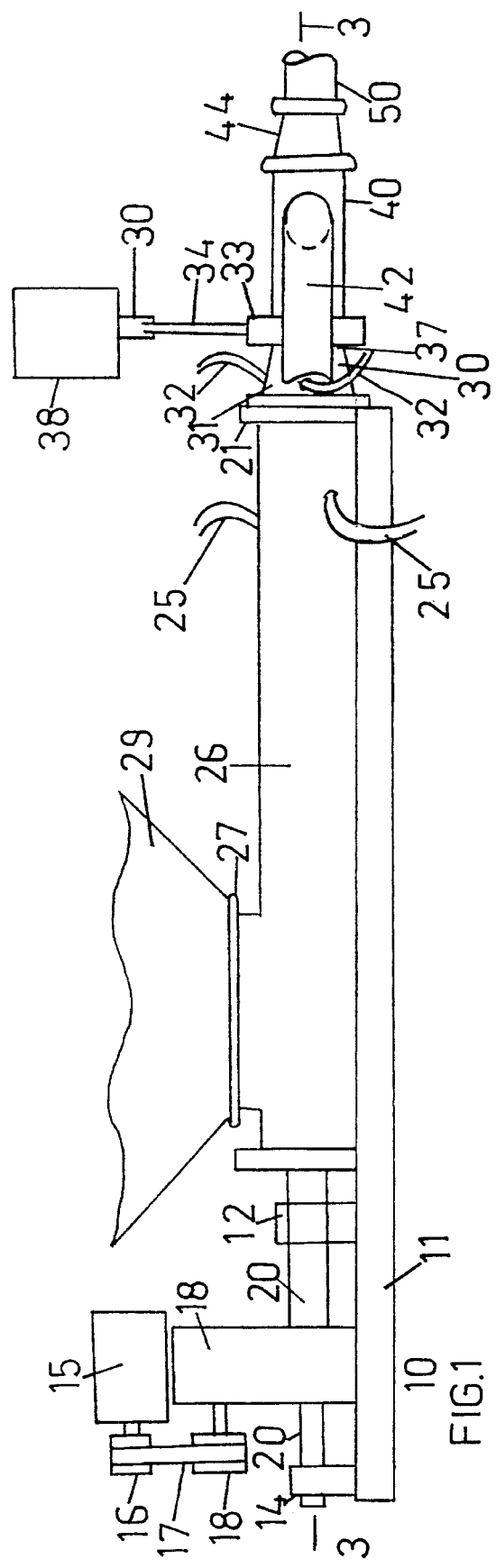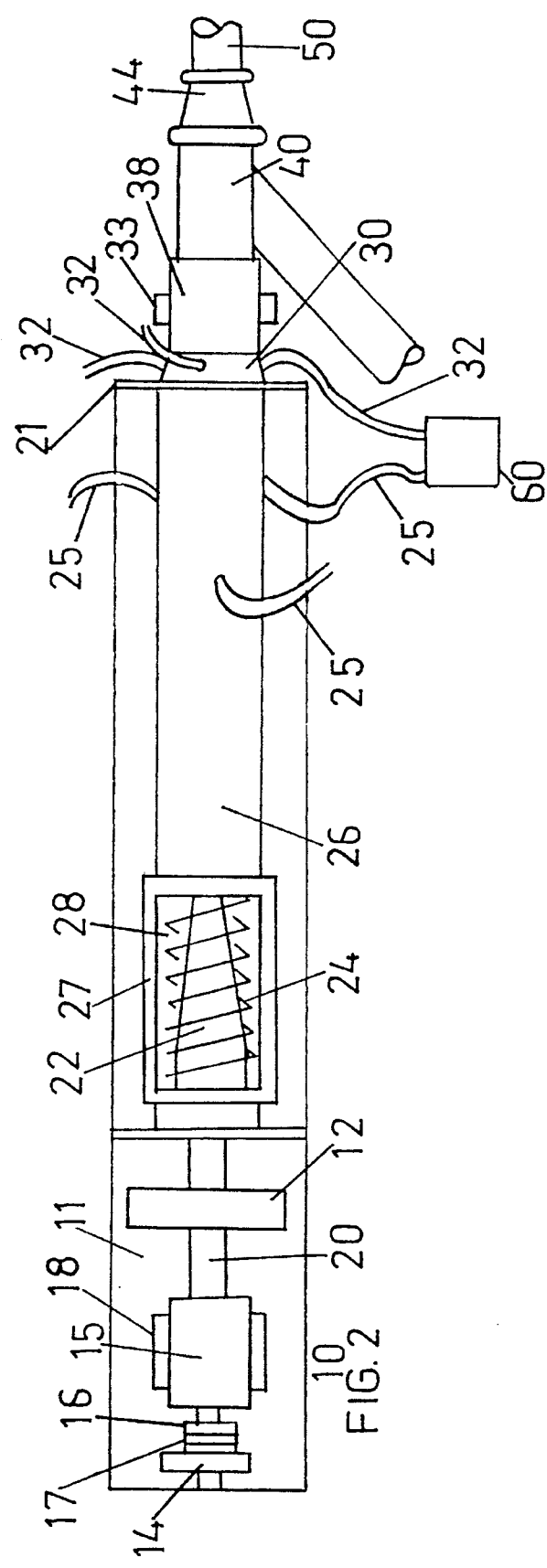

LABYRINTH SEAL COAL INJECTOR

BACKGROUND OF THE INVENTION

1. Field of the Invention.

This invention relates to apparatus for injecting dry, sized material into a pressurized pipeline.

2. Description of Related Art

U.S. Pat. No. 1,614,713 discloses a feeder for powdered fuel in which powdered coal is gravity fed from a hopper into a screw conveyer which feeds the coal into a conduit in which the coal is mixed with and suspended in pressurized air. The coal is conveyed for long distances while suspended in the air streams.

U.S. Pat. No. 3,360,301 discloses a loading apparatus for a bulk transport system in which coal stored in a hopper is suspended in a slurry by addition of water through a conduit at the bottom of the hopper. The slurry is removed from the hopper by an outlet conduit concentric and inside the conduit used for addition of water.

U.S. Pat. No. 4,394,132 discloses apparatus for making a coal-in-liquid mixture in which pre-crushed raw coal is fed through a screw auger into a grinding mill for further processing. The mixing of processed coal and carrier medium takes place in a cone-shaped receiver vessel which feeds into the carrier pipe.

U.S. Pat. No. 4,449,862 discloses apparatus and method for injecting a low pressure slurry into a high pressure stream. The high pressure stream is introduced into a disk-shaped vortex chamber with the formation of a low pressure vortex in the chamber. The low pressure slurry is introduced into the low pressure vortex, is captured by the high pressure flow, and is carried from the chamber with the high pressure stream at the high pressure outlet.

U.S. Pat. No. 4,557,636 discloses the injection of solids into a high pressure slurry stream. In this apparatus, a number of injection points are used to connect to the main slurry line. Each injection point uses a vortex junction as described in U.S. Pat. No. 4,448,862.

U.S. Pat. No. 4,824,294 discloses equipment and method for transporting slurries in which a three-chamber-tube-distributor is used. The chambers are in the forms of U-shaped tubes and are periodically filled and emptied with the result that chambers are filled with slurry under reduced pressure and emptied under high pressure. The filling and transport procedures are controlled electronically. This injector requires slurrying of coal prior to injection, numerous controls and valves, and substantial floor space.

None of the prior art references have the characteristics of the present invention, that of a safe, cost-effective means of continuously injecting dry sized coal and other mined materials into a pressurized hydraulic pipeline for transport.

SUMMARY OF THE INVENTION

This invention is a labyrinth seal coal injector able to inject dry, sized, coal or other materials having a significant amount of fines into a pressurized pipeline for transport or other purposes. The injector is comprised of a rotor or screw of steel helicoidal flights attached to a steel shaft that is rotated by a motor. The rotor is in a pipe-like housing with an inlet on the side for coal and an outlet on the downstream end of the housing at the reducer. The reducer allows the loose coal or other particles to become compacted and form an hydraulic seal against the pressurized water. Water is introduced into the reducer and serves to lubricate the compacted coal as it is introduced into the pipeline. A knife valve is used in initiation of the flow of coal into the pipeline.

An objective of this invention is to provide means for continuous injecting of dry, sized coal into a pressurized hydraulic pipeline.

Another objective is to provide a compact injector with no production limitation.

Another objective is to provide means for injecting coal or other particles of diameter up to one-fourth of the diameter of the transport pipeline into the pipeline.

A final objective of this invention is to provide a safe, cost-effective, environmentally benign means of injecting coal into a pressurized hydraulic pipeline for transport.

BRIEF DESCRIPTION OF THE DRAWINGS

FIG. 1 is a diagrammatic plan view of the labyrinth seal coal injector.

FIG. 2 is a diagrammatic top view of the labyrinth seal coal injector.

DESCRIPTION OF THE PREFERRED EMBODIMENTS

Figure 3:
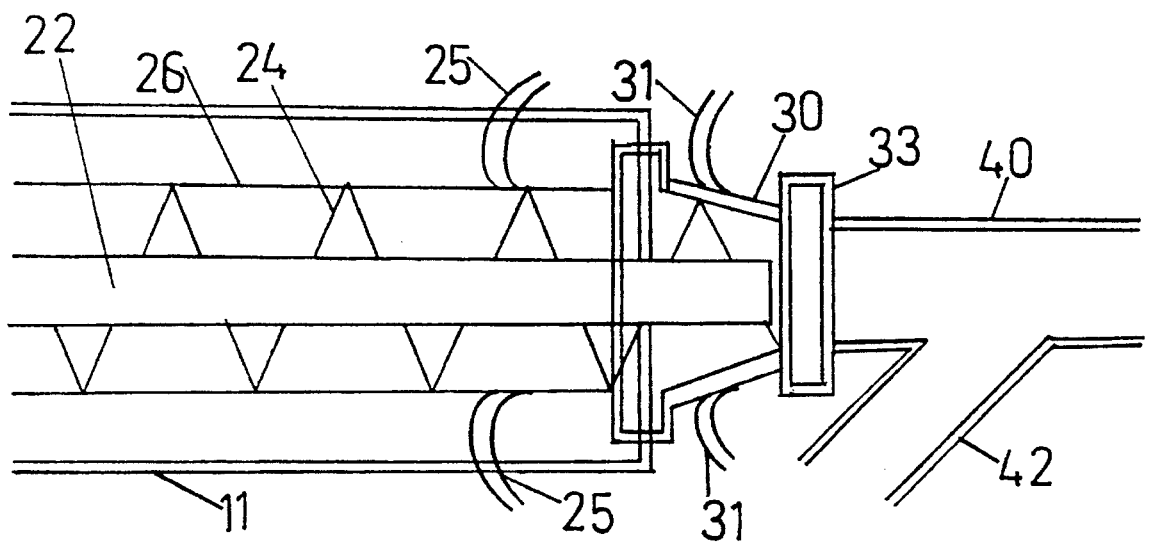
FIG. 3 is a cross section top view of the outlet end of the first embodiment labyrinth seal coal injector.

FIG. 1 is a diagrammatic plan view of the labyrinth seal coal injector 10. FIG. 2 is a diagrammatic top view of the injector with the hopper removed. A base 11 supports the injector. A steel screw housing 26 is supported by the base 11. The housing has an upstream end 23 and a downstream end 21. A rotor 22 is mounted within the housing and is rotated by a shaft 20 which is supported by bearings in a pillow block 12 and a journal box 14. An electric motor 15 is used to rotate the shaft via gearbox 18. The motor is connected to the gearbox by a motor pulley 16 and a belt 17 which drives a gearbox pulley 18.

An opening or inlet 28 is at the top of the screw housing 26. A flange 27 surrounds the opening and is used to connect the hopper 29 to the housing 26. Visible inside the inlet is the rotor 22 upon which are mounted flights 24. The rotor with flights, forming a screw, extends the length of the housing 26. Coal or other particles are stored in the hopper 29 and are fed by gravity into the inlet 28 where they are transported by rotation of the rotor 22 having helical flights 24 to the downstream end 21 of the housing 26. Rotation of the rotor causes movement of coal or other particles toward the downstream end 21 of the housing and compaction of coal near the downstream end and in the reducer 30.

Three housing fluid or water injection inlets with hoses 25 are arrayed equidistant about the circumference of the housing. The housing fluid or water injection inlets with hoses 25 are supplied with water from pump 60. Note that for simplicity only one housing fluid or water injection inlet with a hose 25 is shown connected to pump 60, although all inlets are connected to the pump by hoses.

A reducer 30 is attached to the downstream end of the housing 21. The inlet end 31 of the reducer 30 attached to the housing is of the same diameter as is the housing, while the outlet end 37 of the reducer 30 is of a smaller diameter. The reducer serves as means of compacting loose coal to form a hydraulic seal against pressurized water. Four reducer fluid or water injection inlets with hoses 32 are arrayed equidistant about the circumference of the reducer. Note that for simplicity only one reducing fluid or water injection inlet with a hose 32 is shown connected to pump 60, although all inlets are connected to the pump by hoses. The hoses transport a relatively small amount of injection water from pump 60 to the compacted coal located inside the downstream end 21 of the housing and in the reducer 30.

The function of the small amount of water added by the housing and reducer inlets and hoses is to lubricate the coal as it traverses the downstream end of the housing 21 and the reducer 30 and the mixing chamber 40.

An isolation valve 35 is attached to the outlet end 37 of the reducer 30. The isolation valve 35 consists of a valve housing 33 which is attached to the outlet end 37 of the reducer 30, a knife valve 34 which when activated closes the outlet end 37 of the reducer 30, a pneumatic piston rod 36 which activates the knife valve, and a pneumatic activator 38 which activates and controls the isolation valve 35. The valve housing 33 has a bore of the same diameter as the outlet end 37 of the reducer 30 and the mixing chamber 40. The isolation valve 35 is open when the seal 10 is in operation feeding coal into the pipeline 50. The valve 35 is closed, isolating the coal in the seal from the pipeline, when the seal 10 is not in operation or, as described below, when the seal is in the process of starting.

A mixing chamber 40 is attached to the valve housing 33. Coal or other particles are mixed with water in the mixing chamber forming a slurry. A transport water pipe 42 is attached to the side of the mixing chamber 40. The transport water pipe 42 provides the relative large amounts of pressurized water required for the transport of the coal or particles as a slurry through the pipeline. A mixing chamber connector 44 is attached to the outlet of the mixing chamber 40 and connects the mixing chamber and the pipeline 50.

FIG. 3 is a cross section taken at line 3 of FIG. 1. In this first embodiment the rotor 22 extends into the reducer. In FIG. 3 the flights 24 are distributed in a helical fashion with the flights closer together at the inlet end and further apart at the outlet end of the seal, forming a variable screw rotor.

Figure 4:
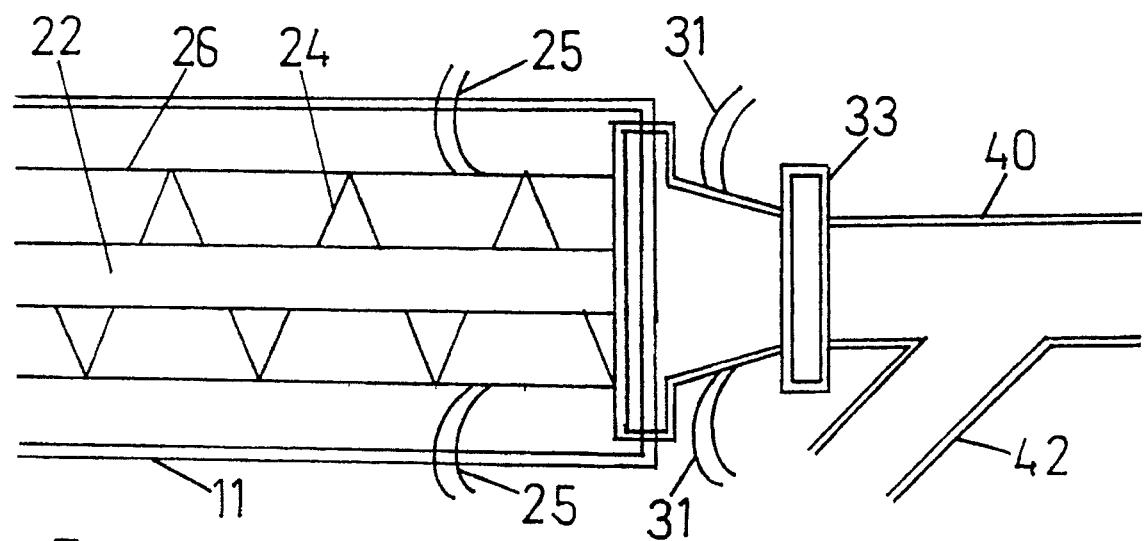
FIG. 4 is a cross section top view of the outlet end of the second embodiment labyrinth seal coal injector.

FIG. 4 is a cross section taken at line 3 of FIG. 1. In this second embodiment the rotor 122 extends only to the end of the housing 26. In FIG. 4 the flights 124 are depicted as uniformly distributed along the length of the rotor, forming a constant screw rotor. Of course, a rotor having uniform flights may be used with the first embodiment rotor or a rotor having flights with a helical fashion may be used with the second embodiment.

The labyrinth seal coal injector uses the inherent ability of compacted, run-of-mine coal to form a hydraulic seal in a pipe. This ability stems from the generation of fine-sized particles during mining. These particles blend together with a range of other size particles to form a compacted seal within a specially designed screw conveyer.

The discovery that a small percentage of water must be injected into the coal at the point of compaction within the injector, which is crucial to maintaining a continuous discharge of coal into a pressurized pipeline, was essential to the present invention.

The largest sized particles should be no more than one-fourth the diameter of the transport pipeline. The screw housing diameter should be at least twice as large as the transport pipeline diameter.

At start-up, the isolation valve is in the closed position to separate the dry coal from the pressurized water in the mixing chamber. The motor is energized to slowly rotate the screw, which starts a forward motion of coal inside the housing until coal reaches the reduce, and is compacted. As soon as coal begins to compact in the reducer, which may be detected by an increase in the screw torque and possible laboring of the motor, the motor is idled to stop the screw rotation. This prevents over-compaction of material in the reducer, which can cause the screw to jam.

Transport water flow is then initiated in the transport water supply pipe until an adequate flow rate to move coal or other materials in the transport pipeline is achieved. The isolation valve is opened and the motor is engaged to start the flow of coal into the mixing chamber. Injection of water into the reducer through the water hoses is initiated immediately to cause formation of a thick coal slurry, which lubricates the coal and the coal-steel inner surface of the reducer interface, thus reducing the torque required to push the compacted coal into the mixing chamber.

The percentage of injection water to coal may vary considerably depending on the type of coal or other material. The sequence and timing of coal and injection water flow may also vary depending on properties of the material being conveyed.

The labyrinth seal coal injector is gravity fed relatively dry, sized coal or other mined materials from a hopper, conveyor, or other device. A sensor or operator must ensure a continuous feed of material into the housing inlet, and must close the isolation valve before the injector becomes empty of particles, to prevent backflow of transport water from the transport pipeline.

EXAMPLE 1

A labyrinth seal coal injector was constructed using a 30 hp motor to power the rotor and a 3 hp motor to power the pump for the injection water. Western colorado coal was injected using a about 25% by weight injection water to 75% by weight coal. The coal was added to transport water and a slurry of at least 70% by weight water was produced in the transportation pipeline.

END OF EXAMPLE 1

The size of the injector varies greatly depending on the application and the required feed rate. For example, a large injector handling a material like crushed, mined coal may have a housing diameter of 1 meter in diameter and a length of 5 meters. A small injector may have a housing diameter of only two centimeters and a length of 10 centimeters.

The rotor, housing, and reducer normally are manufactured of steel, although any other suitable material having the requirements of strength, rigidity, abrasion, and corrosion resistance may be used. Plastic or aluminum may be used for light duty or corrosive applications.

The labyrinth seal coal injector is capable of continuously injecting materials other than coal into a pressurized pipeline or chamber, the main requirement being that the materials contain sufficient quantity of fine particles to form a continuous hydraulic seal within the injector during operation. The minimum particle size is dependent on the material being injected and the hydraulic pressure in the pipeline, container, or vessel receiving the discharged material. Examples of other materials that may be injected include sand, crushed rock, agricultural products, wood chips or shavings, shredded plastic, or properly sized waste materials.

It will be apparent to those skilled in the art that the examples and embodiments described herein are by way of illustration and not of limitation, and that other examples may be utilized without departing from the spirit and scope of the present invention, as set forth in the appended claims.

I claim:

1. Apparatus for injecting dry particles into a pipeline containing a slurry of particles suspended in a pressurized fluid comprising:

a base, a pipe-shaped housing attached to said base, said housing having an upstream end and a downstream end, said housing having an inlet for dry particles on the side of the housing near the upstream end and an outlet for particles at the downstream end, said housing having one or more fluid injection inlets near the downstream end for mixing lubricating fluid with dry particles for the formation of lubricated particles, a powered screw rotor inserted within the housing and extending from the upstream end to the downstream end, a pipe-shaped reducer, said reducer having an inlet end the same diameter as that of the downstream end of said housing, said reducer attached by the inlet end to the downstream end of said housing, said reducer having one or more fluid injection inlets near the inlet end for addition of lubricating fluid to provide further lubrication of lubricated particles, said reducer attached to an isolation valve, a mixing chamber attached to the isolation valve, said mixing chamber having a laterally attached fluid inlet pipe for transport fluid, said mixing chamber attached to a pipeline for transport of a slurry of particles suspended in a pressurized fluid.

2. The apparatus of claim 1 wherein the screw rotor is powered by an electric motor.

3. The apparatus of claim 1 wherein fluid is provided to the fluid injection ports by a pump.

4. The apparatus of claim 1 wherein the isolation valve is a pneumatic knife gate valve.

5. The apparatus of claim 1 wherein the screw rotor is a variable screw rotor.

6. The apparatus of claim 1 wherein the screw rotor is a constant screw rotor.

7. The apparatus of claim 1 wherein the screw rotor does not extend beyond the outlet end of the housing.

8. The apparatus of claim 1 wherein the screw rotor extends from the outlet end of the housing into the reducer.

9. The apparatus of claim 1 wherein lubricating fluid is added at a ratio of about 75 percent by weight particles to 25 percent by weight of lubricating fluid.

10. The apparatus of claim 1 wherein the slurry is comprised of at least 70 percent by weight of transport fluid.

* * * * *